July 1, 1958  E. H. KOLLER  2,840,975
HARVESTER REEL BAT
Filed March 31, 1955
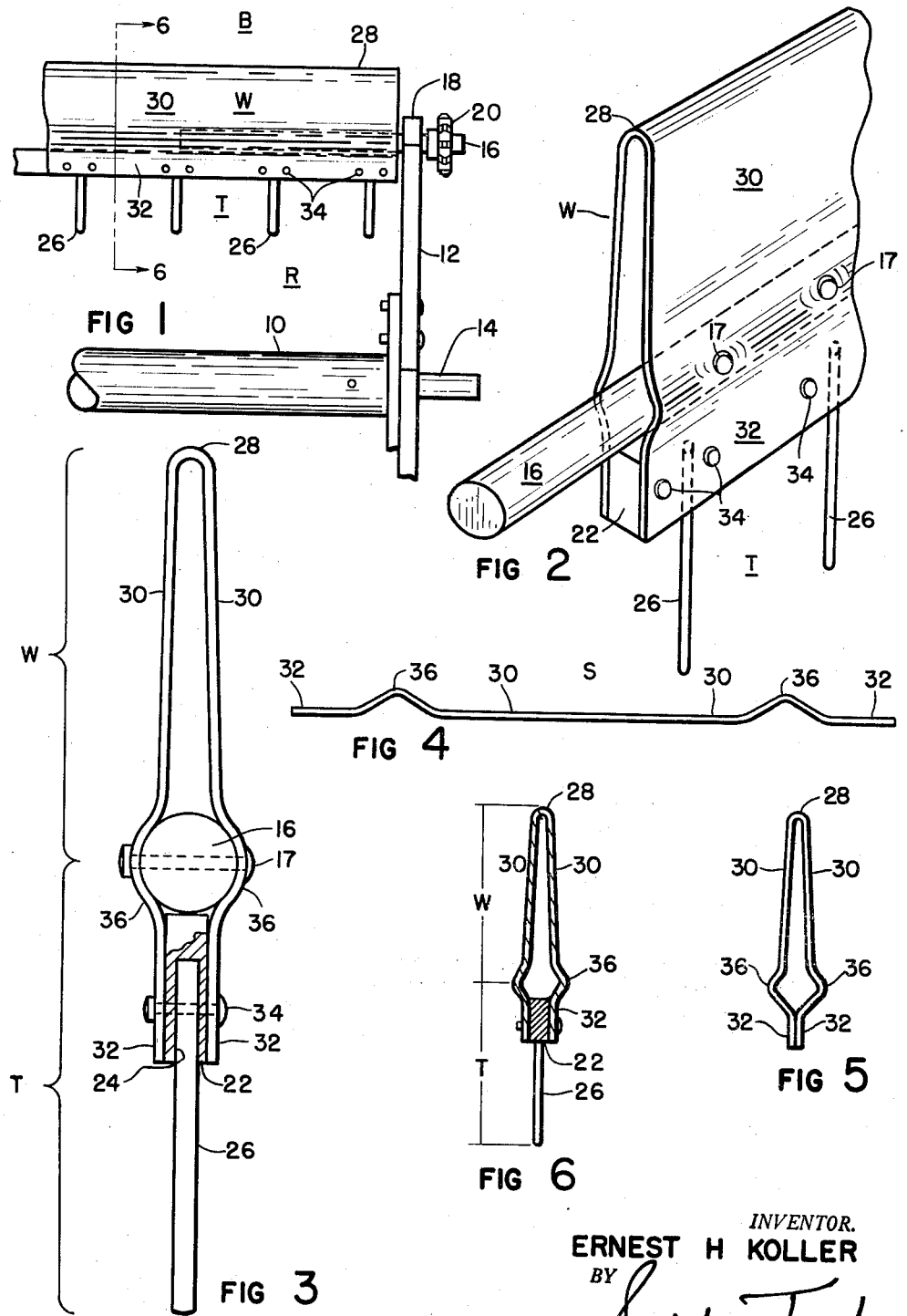
INVENTOR.
ERNEST H KOLLER
BY
Smith + Tuck

United States Patent Office 2,840,975
Patented July 1, 1958

2,840,975

HARVESTER REEL BAT

Ernest H. Koller, Spokane, Wash.

Application March 31, 1955, Serial No. 498,291

4 Claims. (Cl. 56—219)

This invention relates to improvements in a harvester reel bat and, more particularly, to reel bats for reversible use in reels wherein the bat and reel move in a planetary system during harvesting. The invention is specifically directed to providing an improved bat of the reversible type having oppositely directed working wings outstanding on the sides of a longitudinal pivot axis of the bat whereby either working wing may be inverted to bring each to operative positions.

A typical installation of a harvester reel bat according to the present invention is in harvester reels as shown in Patent No. 2,115,385, issued April 26, 1938, to Aaron D. Edgington. In such a reel a pair of spider heads is mounted in a framework for rotation about a common axis. The reel heads include arms and a bat is disposed for pivotal movement between the outer ends of like pairs of arms. Planetary means is connected to the pivotally mounted bats. As the reel is rotated, the bats are caused to travel in annular paths, one after the other, so that all commonly directed edges lead or follow, as the case may be.

It has become general practice to operate such bats with the tined edges leading or the blade edges leading. In other words, one or the other of the like working wings of the series are all commonly directed. On occasion it is desirable to adjust the disposition of the bats so that the working wings are presented to grain in a vertical manner, or at an inclination which may be deemed most suitably operable to accommodate crop conditions.

It has been among the more important objects of this invention to provide: a harvester reel bat having two different working wings and which may be formed entirely of metallic elements for strength, rigidity, and long life, but which at the same time may be lightweight and extremely efficient in gathering vegetable materials such as grain; a harvester reel bat in which an important structural and working element may be formed of conventionally available sheet metal, but at the same time has extreme strength, lightness and cleanness of design; and a harvester reel bat which is simple to construct with normally available simple tools by relatively unskilled labor and which is superior to the bats of the prior art. These and other objects of the invention will become more apparent from a reading of the following specification, and are embraced in and flow from the apparatus described in the specification and shown in the accompanying drawing, in which:

Figure 1 is a fragmentary view in front elevation of a portion of a harvester reel with my improved bat applied thereto;

Figure 2 is an enlarged fragmentary perspective view of one end of my harvester bat;

Figure 3 is an additionally enlarged vertical view of the harvester bat of Figures 1 and 2, with portions broken away and shown in section for convenience of illustration;

Figure 4 is an end view enlarged relative to Figure 1 of a partially shaped strip of metal from which I form one of the working wings of my reversible bat;

Figure 5 is an end view enlarged relative Figure 1 of a slat blade working wing of my bat as formed from the strip of metal of Figure 4, and Figure 6 is a vertical sectional view enlarged relative Figure 1 of a reel bat taken on line 6—6 of Figure 1.

Tremendous acreages of the Western States are employed in the production of wheat and other small grains which are normally grown on relatively flat land. In modern harvesting practices a combine harvester is employed to gather the grain. Normally only the grain heads with a short portion of the straw stalk are cut. The combine passes over the field, and in so doing presents a cutter bar to the grain stalks a short distance under the heads of the grain. In order to insure that the grain heads are pressed or directed to the cutter bar, it is customary practice to employ rotating bat reels which strike into the standing grain and urge it rearward. Because grain normally stands upright, it is desirable that such bats as are employed on the reels enter the grain in as vertical a pattern as possible, move rearwardly through the grain with the bat upright, and then withdraw from the grain at about the point of cutting in a substantially vertical manner. For this season, it has been a common and desirable practice to employ the planetary type harvester reel.

Because of wind and weather conditions, it is not uncommon in certain areas to encounter down grain, that is, grain close to the ground and generally lying below the operative plane of the cutter bar. Often such grain is entangled and matted to such an extent that if the cutter bar is passed through the grain, more will be damaged and lost than will be harvested. For this reason, some years ago reversible bats on harvester reels were devised, as shown by the Edgington patent. With down grain or tangled vegetation, such as with beans or peas, it is customary to present the tined edge of the bat to the vegetation. The tines operate much as the comb and lift the vegetation and hold it as the cutter bar is passed underneath.

With normally standing, generally upright grain stalks, the slat blade edge of a bat is presented to the grain. The reversible bats of this application are adapted and designed to operate efficiently in such crop conditions with a minimum of damage to the grain or leguminous materials being harvested and with the maximum gathering capacity.

The reel, typically shown in Figure 1, comprises a main frame bar 10 which has a series of spider arms 12 outstanding at each end. An axially located main trunnion shaft 14 is provided for mounting the reel for rotation in a frame not shown. Rotative means for such reels are conventional in the art and their showing is also omitted as not necessary to the disclosure of the present invention.

Between opposite pairs of spider arms 12 at the heads of the reel, the latter being designated as a whole by the reference numeral R, is mounted a bat B that forms the substance of this invention. Each bat includes two different working wings. One, designated W, is bladelike, and the other, designated T, has tine fingers outstanding on it. At opposite ends each bat includes a trunnion shaft 16 which provides a longitudinal axis medially located between blade wing W and the tine wing T. Shafts 16 are suitably journalled at 18 in the outer ends of arm 12. A gear 20 is illustrated as part of the planetary system which insures rotation of the bat as it revolves in an annular planetary path with its working wings in upright or inclined planes, as may be desired.

Referring specifically to Figure 3, a flat-sided bar 22 serves as the main or backbone member of the bat. Along one edge, bar 22 is provided with a series of tine sockets 24 in each of which an end of a tine 26 is seated. A desirable method of anchoring the tines 26 in bar 22 is found to be obtained from heating the bar 22 or chilling the tines 26 whereby the sockets readily receive the ends of the tines which are substantially the same size in cross-section as the diameter of socket 24.

When the temperature of the tines and the bar become the same, the tine end will be seized and firmly anchored. Obviously other methods of securing the tines to bar 22 may be employed and such would normally include welding or even cross-pinning.

A slat blade is formed as shown in Figures 4 and 5. An elongated strip of sheet metal S is employed and the same is bent from the planar position of Figure 4 to the hair-pin position of Figure 5 by the forming of a bulldozed bend 28 which is generally smoothly rounded about a fairly short radius. The formation of the bend 28 is important in that it should be arranged that the side walls 30, 30 of the slat are to be brought into juxtaposed contact at their edges, later to be spaced apart from each other, as shown in the various views of the drawings. The edges 32, 32 which are thus brought together, are biased so that they press against each other in this formative step. Thereafter the edges 32 are spread apart and the bar 22 is disposed between them and secured by rivets 34.

The separation of the slat edges 32, 32 by bar 22 imparts an internal stress upon the sheet metal walls 30, 30 and the bulldozed bend 28. It has been found through this arrangement that substantial rigidity and strength is imparted to the bat, while at the same time its construction is lightweight and entirely sufficient for the harvesting purposes for which the bat is to be put.

In order to impart further rigidity to the completed bat and to accommodate the trunnion shaft 16, reinforcing means may be provided to extend along the axis of the bat. Such reinforcement, preferably, outstands on the sides of the bat in such position. One manner of forming such reinforcing means is accomplished by shaping the metal sheet S to form ridges 36, 36 along the margins of the sheet at opposite sides to stand from the plane of the sheet in a common direction. It is desirable that the ridges 36, 36 be formed prior to the formation of the bulldozed bends 28. When that is the case, the resultant form of the slat blade is as in Figure 5. Thus, when the edges 32, 32 are separated by the introduction of the bar 22, additional internal stress is imparted to the structure.

At the ends of the bats, by outwardly shaping the walls 30, 30 to provide the ridges 36, 36, the shafts 16 may be inserted and secured by rivets 17 or other fastening.

From the foregoing it will be seen that I have described a bat for reversible harvester reels in which there is an elongated bar 22 having a series of tines 26 outstanding in a common direction along one edge. An elongated hollow metallic slat blade W, of hair-pin shape in cross-section, is disposed astraddle said bar and outstands therefrom in a direction that is opposite to tines 26. Common edges of sidewalls 30, 30 of the slat blade are secured to the bar and aligned journal means, including shafts such as 16, are securely positioned at the ends of the bat and housed by the slat blade. These shafts 16 provide a longitudinal axis that is medially located between the outer ends of the tines 26 and the outstanding or bulldozed edge 28 of the slat blade. On occasion, reinforcing means is provided along the axis of the bat. This is specifically obtained by forming ridges 36 adjacent the margins or edges 32 of the bent and formed sheet metal slat blade W.

In the use of my bat, when disposed with the bulldozing bend 28 downward, as in the case of harvesting vertically standing grains, this smooth edge easily descends into the grain and simultaneously moves rearward in its planetary path of motion working against the grain and toward the cutter bar. It thereafter withdraws in a clean manner. The absence of outstanding bolt heads, nuts, or other sharp objects, eliminates a great deal of catching in the grain stalks or balling up, as in the case of badly tangled or matted vegetation.

An important aspect of my invention, not readily discernible from the foregoing specification, resides in the operation of the bat when it is functioning with the tines downward. In that instance the tines serve as combing fingers. They tend to enter and engage the tangled vegetation and to lift it toward the cutter bar. On such an occasion it is not uncommon that there also will be some standing grain. At that time the slat blade is in the upper working position and it functions to prevent the grain from falling over and away from the bat as would happen were the blade not present. Such grain is particularly prone to fall over because it is only present in a sparse amount and stands separated and alone in distinction to the condition that is most desirable, i. e., that in which all of the grain is standing and the various stalks tend to mutually support each other.

With the bat operating with bulldozed bend 28 down, that portion of the slat blade which is solid, and lies on the tine side of the bat from the axis outward, functions also to support the upstanding grain stalks. The tines also have a similar function at the time the solid portion of the slat blade is downward. With normal upstanding grain less support appears necessary.

By incorporating my bat into a reel of the type shown in the Edgington patent, or others of well-known construction, rapid reversal of the parts is readily obtained in conventional manners.

While I have shown specific embodiments of my invention herein, it will be readily understood that variations and modifications may be made within the scope and spirit of the subjoined claims.

Having thus described my invention, I claim:

1. A bat for reversible harvester reels, comprising: an elongated metal bar having an aligned series of tines outstanding therefrom; an elongated flat-sided hollow sheet metal slat blade including a pair of opposed side walls joined by a bull nosed bend section forming the blade edge, said blade being hair-pin shaped in cross section, being positioned astraddle said bar, and outstanding from said bar in a direction opposite to said tines; means securing said blade to the bar; and an aligned journal means at the ends of said bat defining a longitudinal axis medially located between the outer ends of the tines and the bull nosed bend section of said blade.

2. A bat for reversible harvester reels, comprising: an elongated metal bar having an aligned series of tines outstanding therefrom; a hair-pin shaped elongated flat-sided hollow metallic slat blade including a medially bent elongated strip of sheet metal and biased to press together the opposite sidewalls thereof, said bar being disposed between said biased together sidewalls to spread the same against the bias and to impart internal stress to said blade; means securing said blade to the bar to outstand therefrom in a direction opposite to said tines; and aligned journal means at the ends of said bat defining a longitudinal axis medially located between the outer ends of the tines and the free edge of said blade.

3. The structure according to claim 2 in which each sidewall of said blade has reinforcing means extending along the axis of the bat defined by said aligned journal means.

4. The structure according to claim 3, in which the reinforcing means comprises a ridge on each sidewall and the same outstands on opposite sides of said bat.

References Cited in the file of this patent

UNITED STATES PATENTS

| Number | Name | Date |
| --- | --- | --- |
| 982,072 | Kullander | Jan. 17, 1911 |
| 1,584,040 | Severn | May 11, 1926 |
| 2,115,385 | Edgington | Apr. 26, 1938 |
| 2,186,682 | Morehouse | Jan. 9, 1940 |
| 2,457,490 | Press | Dec. 28, 1948 |
| 2,644,288 | Henthorn | July 7, 1953 |

FOREIGN PATENTS

| Number | Country | Date |
| --- | --- | --- |
| 697,333 | Great Britain | Sept. 23, 1953 |